US006501807B1

(12) United States Patent
Chieu et al.

(10) Patent No.: US 6,501,807 B1
(45) Date of Patent: Dec. 31, 2002

(54) DATA RECOVERY SYSTEM FOR RADIO FREQUENCY IDENTIFICATION INTERROGATOR

(75) Inventors: Trieu C. Chieu, Scarsdale, NY (US); Li-Cheng Zai, Los Gatos, CA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/294,469

(22) Filed: Apr. 20, 1999

Related U.S. Application Data (63) Continuation-in-part of application No. 09/153,617, filed on Sep. 15, 1998.
(60) Provisional application No. 60/073,933, filed on Feb. 6, 1998.

(51) Int. Cl.[7] .............................. H03D 3/22; H04B 5/00
(52) U.S. Cl. ......................................... 375/329; 455/41
(58) Field of Search ................................. 375/329, 130, 375/322, 224, 326, 279, 308; 342/42, 51; 455/41, 45, 46; 329/304, 310

(56) References Cited

U.S. PATENT DOCUMENTS

| | | | |
|---|---|---|---|
| 4,041,490 A | * | 8/1977 | Watt ........................... 342/135 |
| 4,888,591 A | | 12/1989 | Landt et al. |
| 5,349,332 A | | 9/1994 | Ferguson et al. |
| 5,477,225 A | | 12/1995 | Young et al. |
| 5,510,795 A | | 4/1996 | Koelle |
| 5,649,296 A | | 7/1997 | MacLellan et al. |
| 5,777,561 A | | 7/1998 | Chieu et al. |
| 5,784,686 A | | 7/1998 | Wu et al. |
| 5,842,118 A | | 11/1998 | Wood, Jr. |
| 6,057,779 A | * | 5/2000 | Bates ....................... 340/10.51 |
| 6,122,329 A | * | 9/2000 | Zai et al. ..................... 342/42 |

OTHER PUBLICATIONS

"SA 17.5: A Low–Power CMOS Integrated Circuit For Field–Powered Radio Frequency Identification Tags" by Friedman et al., 1997 IEEE International Solid State Circuits Conference, Feb. 8, 1997.

* cited by examiner

*Primary Examiner*—Chi Pham
*Assistant Examiner*—Khai Tran
(74) *Attorney, Agent, or Firm*—O'Melveny & Myers LLP (57) ABSTRACT

An RF/ID interrogator is provided for recovering a data signal from an RF/ID tag. The interrogator includes a radio having a receiver portion to receive in-phase (I) and quadrature-phase (Q) signals from the RF/ID transponder transmitted at a predetermined bit-rate, and a processor coupled to the radio for controlling operation of the radio in accordance with stored program instructions. In one embodiment, the interrogator performs over-sampling of the data signal received from the RF/ID tag in order to provide a high data recovery rate. The processor controls the over-sampling of the I and Q signals at a sampling rate higher than the transmitted bit-rate of the I and Q signals to provide plural signal samples that are stored in a buffer memory. The processor compares the relative polarity of successive ones of the plural signal samples. Based on this comparison, data bits are derived from the successive ones of the plural signal samples in correspondence with the number of the successive ones of the plural signal samples having same relative polarity. In another embodiment, the interrogator performs a selection between the I and Q signals in order to achieve optimum data recovery. The processor detects relative signal strength of the I and Q signals, and selects one of the I and Q signals for subsequent processing based on the detected relative signal strength. Data bits are then recovered from the selected one of the I and Q signals.

53 Claims, 6 Drawing Sheets

DATA RECOVERY SYSTEM FOR RADIO FREQUENCY IDENTIFICATION INTERROGATOR

RELATED APPLICATION DATA

This application is a continuation-in-part of U.S. patent application Ser. No. 09/153,617, filed Sep. 15, 1998, which claims the benefit of U.S. Provisional Patent Application Ser. No. 60/073,933, filed Feb. 6, 1998, which is specifically incorporated by reference herein in its entirety.

BACKGROUND OF THE INVENTION

1. Field of the Invention

The invention relates to radio frequency identification (RF/ID) interrogators and transponders, and more particularly, to a novel RF/ID interrogator signal processing system architecture for recovering data communicated from an RF/ID transponder.

2. Description of Related Art

In the automatic data identification industry, the use of RF/ID transponders (also known as RF/ID tags) has grown in prominence as a way to track data regarding an object to which the RF/ID transponder is affixed. An RF/ID transponder generally includes a semiconductor memory in which digital information may be stored, such as an electrically erasable, programmable read-only memory (EEPROMs) or similar electronic memory device. Under a technique referred to as "backscatter modulation," the RF/ID transponders transmit stored data by reflecting varying amounts of an electromagnetic field provided by an RF/ID interrogator by modifying their antenna matching impedances. The RF/ID transponders can therefore operate independently of the frequency of the energizing field, and as a result, the interrogator may operate at multiple frequencies so as to avoid radio frequency (RF) interference, such as utilizing frequency hopping spread spectrum modulation techniques. The RF/ID transponders may either be passive, in which they extract their power from the electromagnetic field provided by the interrogator, or active, in which they include their own power source.

Since RF/ID transponders do not include a radio transceiver, they can be manufactured in very small, light weight and inexpensive units. Passive RF/ID transponders are particularly cost effective since they lack a power source. In view of these advantages, RF/ID transponders can be used in many types of applications in which it is desirable to track information regarding a moving or inaccessible object. One such application is to affix RF/ID transponders to work pieces moving along a conveyor belt of an assembly line. The RF/ID transponders would contain stored information regarding the particular assembly requirements for the work piece to enable automated equipment to operate on the work piece and perform certain tasks particular to the unique work piece requirements. This way, products having different assembly requirements can be sent down the same assembly line without having to modify the assembly line for each unique requirement. Another application for RF/ID systems is to collect information from a moving motor vehicle, such as for vehicle toll collection.

A drawback with RF/ID interrogators using backscatter modulation is that they generally have data recovery rates that are unacceptable for many types of user applications, due in large part to inherent defects of the RF/ID tags. One reason for the low data recovery rate is that passive RF/ID tags that do not have an internal power source generally suffer from oscillator instability. This instability causes the bit-clock rate of the RF/ID tag to vary by as much as ±25% with respect to the reference rate provided by the RF/ID interrogator. Such levels of oscillator instability preclude the RF/ID interrogators using backscatter modulation from synchronizing with the signal transmitted by the RF/ID tag, resulting in loss of the data contained within the signal.

Another drawback of some RF/ID tags is pulse distortion as a characteristic of the on-off keying (OOK) modulation scheme utilized in backscatter modulation. According to the OOK modulation scheme, a data "0" corresponds to a "short circuit" condition of the RF/ID tag antenna, and a data "1" corresponds to an "open circuit" condition of the RF/ID tag antenna. Ideally, the pulse width corresponding to both an "open circuit" condition and a "short circuit" condition should be equal. In practice, however, the pulse width corresponding to an "open circuit" condition sometimes is shorter than that of a "closed circuit" condition. This phenomenon becomes even more significant as the RF/ID tag is brought into close proximity with the RF/ID interrogator. Pulse distortion tends to result in decode errors of the received data, and is further exacerbated when the RF/ID tag is moving relative to the RF/ID interrogator and there is a limited window of time for the interrogator to recover the data from the tag.

Thus, it would be very desirable to provide an RF/ID interrogator that can compensate for these and other defects of passive RF/ID tags in order to yield a higher data recovery rate.

SUMMARY OF THE INVENTION

In accordance with the teachings of the present invention, an RF/ID interrogator is provided for recovering a data signal from an RF/ID tag. The interrogator includes a radio having a receiver portion to receive in-phase (I) and quadrature-phase (Q) signals from the RF/ID transponder transmitted at a predetermined bit-rate, and a processor coupled to the radio for controlling operation of the radio in accordance with stored program instructions.

In one embodiment of the invention, the interrogator performs over-sampling of the data signal received from the RF/ID tag in order to provide a high data recovery rate. The processor controls the over-sampling of the I and Q signals at a sampling rate higher than the transmitted bit-rate of the I and Q signals to provide plural signal samples that are stored in a buffer memory. The relative polarity of successive ones of the plural signal samples are compared by the processor. Based on this comparison, data bits are derived from the successive ones of the plural signal samples in correspondence with the number of the successive ones of the plural signal samples having same relative polarity. More specifically, the processor determines whether signal samples correspond to a "1" or a "0" based on the number on consecutive positive or negative signal samples. Thereafter, an encoded data signal may be recovered from the derived data bits.

In another embodiment of the invention, the interrogator performs a selection between the I and Q signals in order to achieve optimum data recovery. The processor detects a relative signal strength of the I and Q signals, and selects one of the I and Q signals for subsequent processing based on the detected relative signal strength. Data bits are then recovered from the selected one of the I and Q signals. The processor may select the one of the I and Q signals having highest initial signal strength, or having highest current signal strength. Alternatively, the processor may select a combination of the I and Q signals.

A more complete understanding of the RF/ID interrogator data recovery system will be afforded to those skilled in the art, as well as a realization of additional advantages and objects thereof, by a consideration of the following detailed description of the preferred embodiment. Reference will be made to the appended sheets of drawings, which Will first be described briefly.

DETAILED DESCRIPTION OF THE PREFERRED EMBODIMENT

The present invention satisfies the need for an RF/ID interrogator that compensates for certain known defects with RF/ID tags in order to yield an acceptably high data recovery rate. In the detailed description that follows, like element numerals are used to describe like elements illustrated in one or more of the figures.

Figure 1:
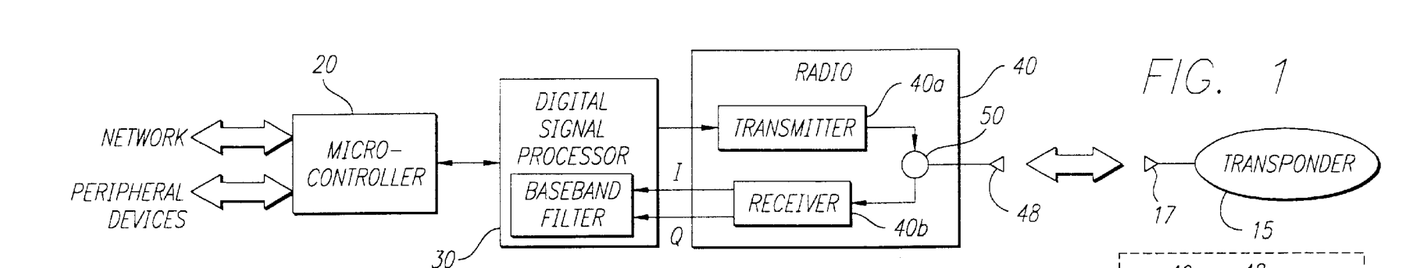
FIG. 1 is a block diagram illustrating an RF/ID interrogator and transponder.

Referring first to FIG. 1, an RF/ID interrogator 10 and tag 15 in accordance with an embodiment of the present invention are illustrated. The interrogator 10 comprises a microcontroller module 20, a digital signal processor (DSP) module 30, and a radio module 40. The microcontroller module 20 provides control over high level operation of the interrogator 10 and communicates with an external network and peripheral devices. The DSP module 30 provides direct control over all operations of the radio module 30 in response to high level commands provided by the microcontroller module 20. The radio module 30 provides for RF communications to/from the tag 15. The tag 15 is disposed in proximity to the interrogator 10, and has an antenna 17 that radiates an RF backscattered signal in response to an RF transmission signal provided by the interrogator. As known in the art, the tag 15 may either be passive, whereby it receives its power from the modulated electromagnetic field provided by the interrogator 10, or active, whereby it contains its own internal power source, such as a battery. It should be appreciated that the data recovery techniques described below are particularly applicable to passive tags that have defects that render their transmitted signal unstable or otherwise difficult to recover data therefrom.

More particularly, the radio module 40 further comprises a transmitter portion 40a, a receiver portion 40b, a hybrid 50, and an antenna 48. The hybrid 50 may further comprise a circulator. The transmitter portion 40a includes a local oscillator that generates an RF carrier frequency. The transmitter portion 40a sends a transmission signal modulated by the RF carrier frequency to the hybrid 50, which in turn passes the signal to the antenna 48. The antenna 48 broadcasts the modulated signal and captures signals radiated by the tag 15. The antenna 48 then passes the captured signals back to the hybrid 50, which forwards the signals to the receiver portion 40b. The receiver portion 40b mixes the captured signals with the RF carrier frequency generated by the local oscillator to directly downconvert the captured signals to a baseband information signal. The baseband information signal comprises two components in quadrature, referred to as the I (in phase with the transmitted carrier) and the Q (quadrature, 90 degrees out of phase with the carrier) signals. The hybrid 50 connects the transmitter 40a and receiver 40b portions to the antenna 48 while isolating them from each other. In particular, the hybrid 50 allows the antenna 48 to send out a strong signal from the transmitter portion 40a while simultaneously receiving a weak back-scattered signal reflected from the transponder 15.

Figure 2:
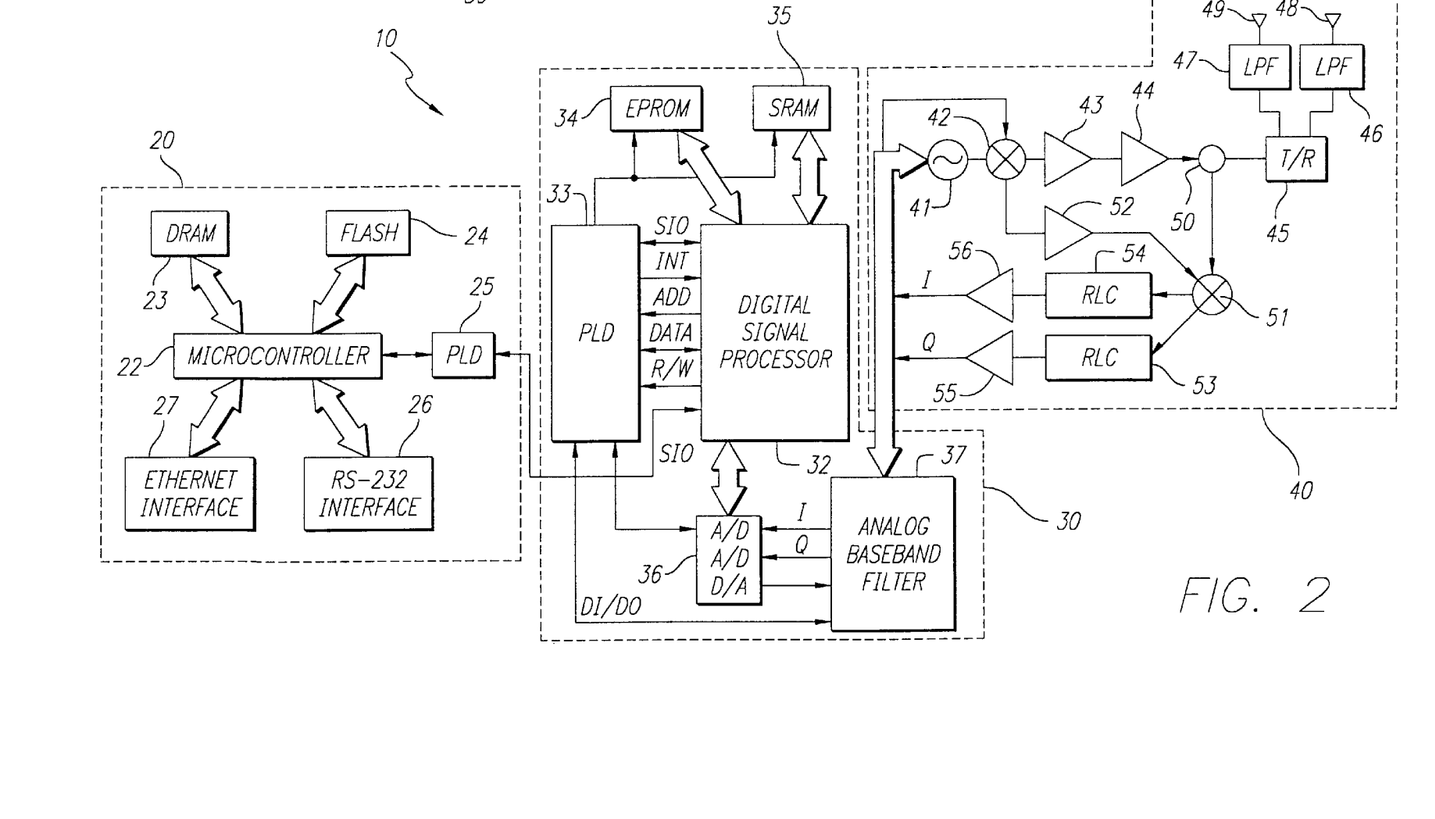
FIG. 2 is a first embodiment of the RF/ID interrogator of FIG. 1.

Referring now to FIG. 2, another embodiment of an RF/ID interrogator 10 is illustrated. The microcontroller module 20 further comprises a microcontroller 22, a dynamic random access memory (DRAM) 23, a flash memory 24, a programmable logic device (PLD), an Ethernet interface 27, and an RS-232 interface 26. The microcontroller 22 may be provided by a general-purpose microprocessor adapted to execute a series of instructions (i.e., software or firmware) at a relatively high clock rate, such as the Motorola 68360 series microcontroller. The PLD 25 provides a high-speed serial data interface between the microcontroller module 20 and the DSP module 30, and serves to control the timing and format of signals passing between the microcontroller module and the DSP module. The microcontroller module 20 handles the power-up initialization of the interrogator 10, host communications, RF/ID protocol, and error recovery.

The DRAM 23 is accessible by the microcontroller 22 through a parallel data connection and provides for volatile memory storage of data values generated during the execution of instructions by the microcontroller. The flash memory 24 is also accessible by the microcontroller 22 through a parallel data connection and provides non-volatile memory storage for the microcontroller 22. The flash memory 24 may contain program instructions utilized upon the initial start-up of the interrogator 10. The start-up program is uploaded from the flash memory 24 to the microcontroller 22, and copied to the DRAM 23 to provide a high speed memory access space for execution of the program. It should be appreciated that other types of commercially available, non-volatile memory may be used instead of flash memory, such as an electrically erasable, programmable, read-only memory (EEPROM), or optical or magnetic disk storage devices.

The ethernet interface 27 and RS-232 interface 26 provide for communications by the interrogator 10 with external systems. As known in the art, the ethernet interface 27 permits parallel data communication between the interrogator 10 and a wired or wireless local area network (LAN). The RS-232 interface 26 permits serial data communication between the interrogator 10 and peripheral devices, such as a printer, monitor, bar code scanner, or other such device.

The DSP module 30 includes a DSP 32, an EEPROM 34, a static random access memory (SRAM) 35, a PLD 33, a data converter 36, and an analog baseband filter 37. The DSP 32 may be provided by a special purpose microprocessor optimized to perform high-speed mathematical calculations, such as the Texas Instrument 320C50 series DSP. The DSP module 30 controls all tasks associated with the radio module 40, such as generation of error correction codes (e.g., Manchester code and cyclic redundancy check (CRC)), and determination of the frequency hopping rate and channel dwell time. The microcontroller module 20 provides control signals in the form of data packets over the serial data link to direct the specific operations controlled by the DSP module 30, such as transmitting or receiving data. Data that is recovered from and transmitted to the tag 15 is also passed between the microcontroller module 20 and the DSP module 30.

The PLD 33 provides an interface between the DSP 32 and the radio module 40, and controls operation of the EEPROM 34 and SRAM 35 memory devices. The SRAM 35 is accessible by the DSP 32 through a parallel data connection and provides for non-volatile memory storage of data values generated during the execution of instructions by the microcontroller. The EEPROM 34 is also accessible by the DSP 32 through a parallel data connection and provides non-volatile memory storage for the DSP module 30. It should be appreciated that other types of commercially available, memory devices may be used instead of the EEPROM 34 or the SRAM 35.

The data converter 36 includes two analog-to-digital (A/D) converters and a digital-to-analog (D/A) converter. The A/D converters sample the analog I and Q signals received from the radio module 40 to provide a binary data stream to the DSP 32. The D/A converter converts a digital signal provided by the DSP 32 to an analog signal used to control the frequency of the local oscillator of the radio module 40 (described below). The analog baseband filter 37 provides matched bandpass filtering and amplification of the I and Q signals. The analog baseband filter 37 includes a low noise amplifier stage, and cascading high pass filter and low pass filter stages to provide an 80 dBc adjacent channel rejection. The gain of the low noise amplifier stage is programmable by the DSP 32 through the PLD 33.

The PLD 33 provides decode logic for memory mapping the EEPROM 34 and SRAM 35 memory devices. The PLD 33 also has programmable timers for controlling the timing of sending and receiving of data between the DSP 32 and the radio module 40 (as will be further described below). A plurality of signals are transferred between the PLD 33 and the DSP 32 for sending control signals to the radio module 40 and to read/write data from/to the EEPROM 34 and SRAM 35 memory devices. Data is transmitted bi-directionally between the PLD 33 and the DSP 32. The DSP 32 provides address (ADD) information to the PLD 33 to identify specific addresses for information stored within the EEPROM 34 and SRAM 35 memory devices. The DSP 32 provides a read/write signal (R/W) to the PLD 33 to distinguish between a memory read and a memory write operation. Interrupts (INT) are provided by the PLD 33 to the DSP 32 to trigger execution of program steps in response to completion of timed events. Serial input/output (SIO) of data signals pass bi-directionally between the PLD 33 and the DSP 32. The PLD 33 provides control data (DI/DO) to the analog baseband filter 37 to control the bandpass filter parameters and program the gain of the amplifier stages.

The radio module 40 comprises a direct-conversion receiver and uses on-off keying (OOK) for downlink communication (i.e., from the interrogator 10 to the tag 15). A local oscillator 41 generates an RF carrier (fc), such as may be provided by a voltage controlled amplifier (VCO). The local oscillator 41 is controlled by signals provided by the DSP module 30 to generate the RF carrier at predefined frequencies (e.g., around 2.4 GHz) for predefined dwell periods (e.g., 0.4 seconds) in accordance with a predetermined hopping sequence. In a preferred embodiment of the present invention, the hopping sequence is defined by the IEEE Wireless LAN draft standard 802.11, which is incorporated by reference herein.

On the transmit side, the radio module 40 includes a mixer 42, pre-amplifier stages 43, 44, and the hybrid 50. To transmit data from the interrogator 10 to the tag 15, analog data signals are provided from the DSP module 30 to the mixer 42. The mixer 42 mixes the analog data signals with the RF carrier provided by the local oscillator 41 to provide a modulated carrier signal. To receive backscattered data from the transponder 15, the radio module 40 transmits the RF carrier alone (i.e., without any analog data signals) at full power. The pre-amplifier stages 43, 44 raise the power of the transmitted signal (with or without modulated analog data signals) from the mixer 42 to a desired power level for broadcast as an RF signal. The hybrid 50 couples the transmitted signal to an antenna in the manner described above with respect to FIG. 1.

In an embodiment of the invention, the radio module 40 includes a pair of antennas 48, 49, having respective low pass filters 46, 47. Each one of the antennas 48, 49 are coupled to the hybrid 50 through a transmit/receive (T/R) switch 45. The antennas 48, 49 may be adapted to transmit linearly polarized radiation in directions oriented orthogonal to each other, so that particular transponders can communicate with the interrogator 10 on the basis of their orientation. The DSP module 30 provides a digital signal to control the T/R switch 45 in order to determine the routing of RF signals to or from the antennas 48, 49. An example of a method for selecting groups of RF tags using plural polarized antennas is disclosed in U.S. Pat. No. 5,777,561, for "Method of Grouping RF Transponders." It should also be appreciated that a single antenna can also be advantageously utilized, as described above with respect to FIG. 1.

On the receive side, the radio module 40 comprises a mixer 51 coupled to the hybrid 50, an I channel RLC circuit 54 with corresponding amplifier stage 56, and a Q channel RLC circuit 53 with corresponding amplifier stage 55. The RF carrier provided by the local oscillator 41 through the mixer 42 passes through an amplifier stage 52 to the mixer 51. Backscattered signals received through one of the antennas 48, 49 pass through the hybrid 50 to the mixer 51. By mixing the received signals with the RF carrier, the received signals are directly downconverted to baseband I and Q signals. The I and Q signals are thereafter provided to the analog baseband filter 37 of the DSP module 30 as substantially described above.

Figure 3:
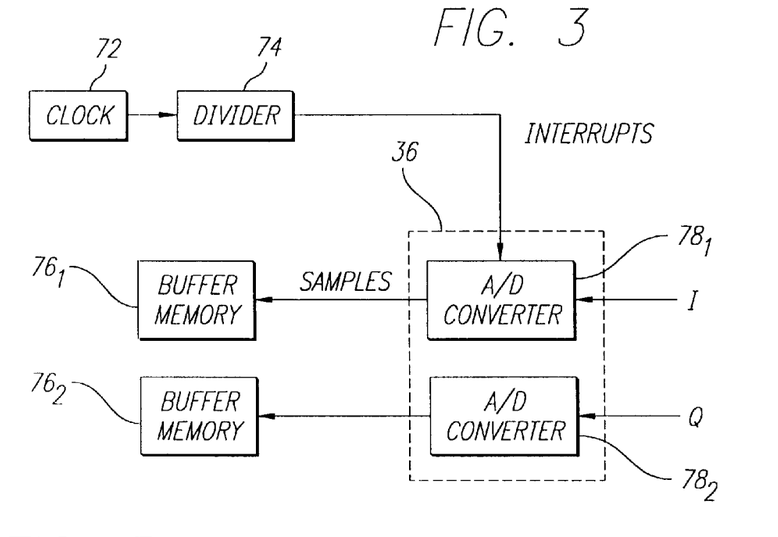
FIG. 3 is a block diagram illustrating a data sampling portion of the RF/ID interrogator.

Referring now to FIG. 3, a portion of the RF/ID interrogator 10 used for data recovery is illustrated in greater detail. The baseband I and Q signals are provided to respective A/D converters $78_1$, $78_2$ of the data converter 36 described above. The A/D converters $78_1$, $78_2$ are triggered by interrupts generated within the processor module. Particularly, a clock 72 generates a high frequency clock signal (e.g., 40 MHz) which is reduced by a divider circuit 74 to a desired interrupt rate. In a preferred embodiment of the present invention, a system clock within the DSP 32 provides the clock 72. Alternatively, the clock 72 may comprise a separate circuit element. The divider circuit 74 may comprise a flip-flop circuit driven by a counter to issue an interrupt signal after a programmed number of system clock pulses are generated. The counter enables the divider circuit 74 to be programmed for any desired count value in order control the interrupt rate.

As described above, passive RF/ID tags generally suffer from instability of its internal oscillator. In some cases, the instability of the RF/ID tag oscillator can result in a bit-rate that varies between 60 and 80 kilobits per second (kbps). Accordingly, an interrupt rate of 250 Khz is provided to the A/D converters $78_1$, $78_2$, which is roughly four times the estimated bit-rate of the RF/ID tag 15. The high interrupt rate permits multiple samples of the received signal for each transmitted data bit, i.e., over-sampling of the received signal. Each time that the A/D converters $78_1$, $78_2$ are triggered by the interrupts, respective digital samples (e.g., eight bits) of the baseband I and Q signals are transferred to respective buffer memory spaces $76_1$, $76_2$. The digital samples are stored temporarily in the buffer memory spaces $76_1$, $76_2$ until processed by the DSP 32, as will be further described below. It should be appreciated that interrupt rates greater than four times the estimated bit rate of the RF/ID tag 15 would be further advantageous in providing information useful for recovering the data from the received signal, although the complexity of the data recovery algorithm would also increase.

The DSP 32 initiates the buffering of the digital samples by executing a radio receiver interrupt service routine. Interrupts are provided to the A/D converters $78_1$, $78_2$ for a period of time corresponding to the expected length of the received signals or until the data capacity of the buffer memory spaces $76_1$, $76_2$ is reached. The interrupts are enabled only during the time that the DSP 32 is listening on the RF channel for incoming signals from RF/ID tags 15.

Figure 4:
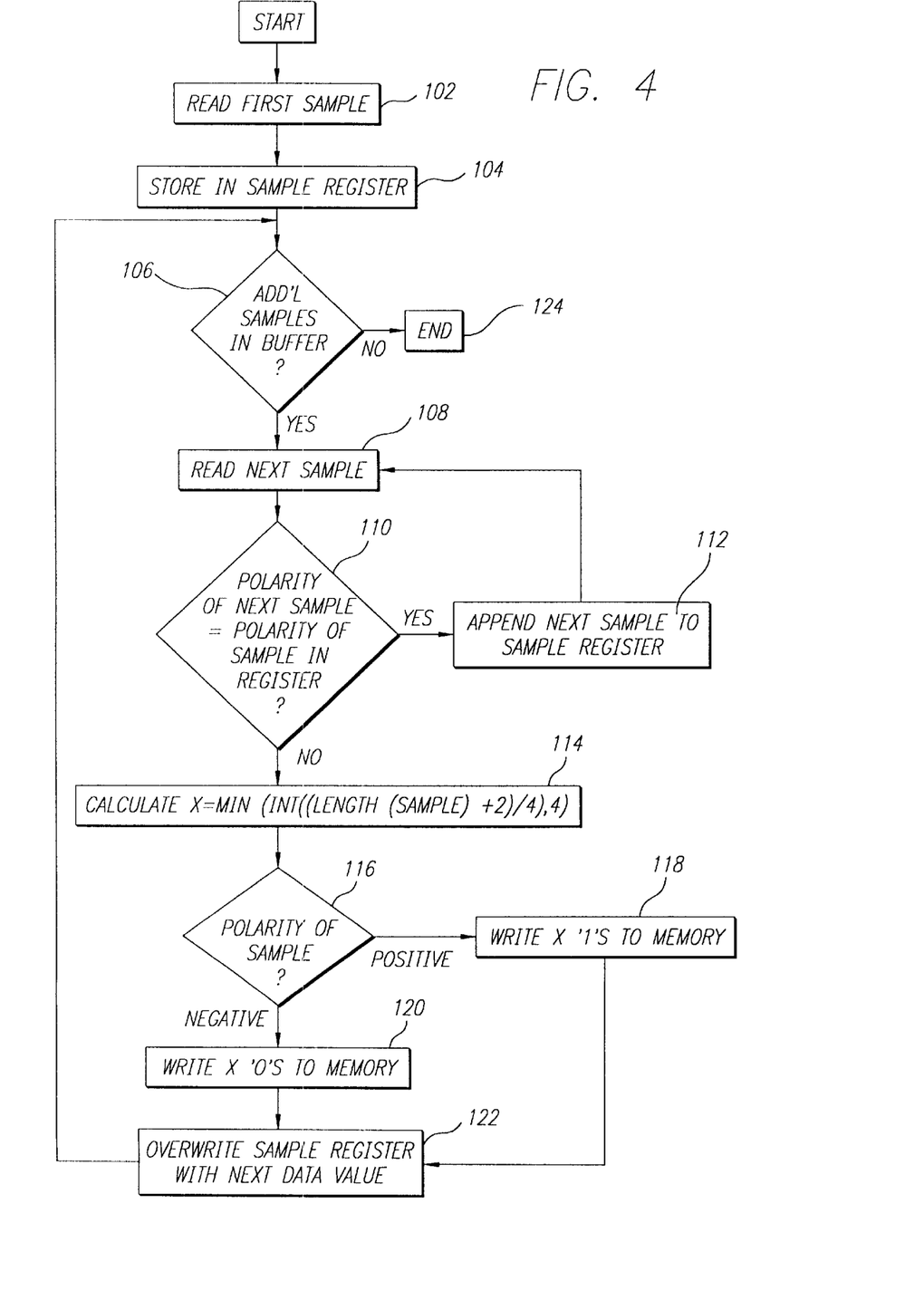
FIG. 4 is a flow chart illustrating an exemplary data recovery scheme performed by the RF/ID interrogator.

FIG. 4 illustrates an exemplary data recovery algorithm performed by the DSP 32 to recover RF/ID tag data bits from the samples stored in the buffer memory spaces $76_1$, $76_2$. The following description of the data recovery algorithm corresponds to the processing of the I signal samples generated using four-times oversampling, but it should be appreciated that the same algorithm would be executed for the Q signal samples. Generally, the algorithm performs the function of deciding whether successive ones of the samples constitute a bit value of "0" or "1" based on the number of successive positive or negative samples. More particularly, the algorithm decodes the samples into digital bits on the basis of the following four rules: (1) two to five consecutive positive or negative samples are decoded as "1" or "0", respectively; (2) six to nine consecutive positive or negative samples are decoded as "11" or "00", respectively; (3) ten to thirteen consecutive positive or negative samples are decoded as "111" or "000", respectively; and, (4) fourteen or more consecutive positive or negative samples are decoded as "1111" or "0000", respectively.

The algorithm begins at step 102, at which step the DSP 32 retrieves the first sample from the buffer memory space $76_1$, and stores the retrieved sample in a register referred to as SAMPLE at step 104. Starting at step 106, the algorithm performs a loop during which the polarity of successive samples is compared and decoded digital bits are stored in memory. At step 106, a determination is made as to whether there is a subsequent sample in the buffer memory space 761. If there are no additional samples in the buffer memory space $76_1$, meaning that the received signal has either ended or has been interrupted, then the algorithm terminates at step 124. If there are additional samples in the buffer memory space $76_1$, the algorithm proceeds to step 108 at which the DSP 32 retrieves the next sample from the buffer memory space. Then, at step 110, a comparison is made between the sample retrieved at step 108 and the sample stored in the register SAMPLE. If the digital sample retrieved at step 108 has the same polarity as the digital sample stored in the register SAMPLE, then the algorithm proceeds to step 112. It should be appreciated that the retrieved samples are actually multiple-bit values determined by the A/D converters $78_1$, $78_2$ corresponding to the analog value of the baseband I or Q signals. The polarity of the samples is construed as being either "positive" or "negative" depending upon whether they are above or below a predetermined threshold level. At step 112, the algorithm appends the sample retrieved at step 108 to the sample stored in the register SAMPLE, and returns to step 106 whereupon the processing loop repeats. Conversely, if the sample retrieved at step 108 does not have the same polarity as the sample stored in the register SAMPLE, then the algorithm proceeds to step 114.

At step 114, the algorithm calculates a value X that is based on the number of appended samples presently stored in the register SAMPLE. Specifically, the value X is determined according to the following equation:

$$X=\min(\mathrm{INT}((\mathrm{length}(\mathrm{SAMPLE})+2)/4), 4$$

First, the algorithm calculates the number of appended samples stored in the register SAMPLE, i.e., the "length" of the stored value. To this length value, the algorithm adds two and divides the sum by four. The integer portion of the remainder is then compared to four, and if it is less than four, X is equal to the integer portion. Otherwise, if four is equal to or greater than the integer portion, then X is equal to four. Next, at step 116, if the polarity of the first sample stored in the register SAMPLE is positive the algorithm proceeds to step 118, and if the polarity of the sample is negative the algorithm proceeds to step 120. At step 118, X number of successive digital bits having a value of "1" are stored in memory. Conversely, at step 120, X number of successive digital bits having a value of "0" are stored in memory. It should be appreciated that the foregoing equation and associated steps carry out the rules for determining the binary state of the samples set forth above. It should also be appreciated that the foregoing is only one way to carry out the rules, and that alternative algorithms and equations can be advantageously used.

At step 122, the register SAMPLE is overwritten with the next sample that was previously retrieved at step 108. Then, the algorithm returns to step 106, and the loop cycles through again. This process will continue to repeat until there are no additional samples in the buffer memory space $761_1$.

In an alternative embodiment of the present invention, the algorithm may be modified to compensate for pulse distortion. As discussed above, some types of passive RF/ID tags communicating using backscatter modulation are known to exhibit pulse distortion in which the pulse width corresponding to an "open-circuit" condition tends to be shorter than the pulse width corresponding to a "short-circuit" condition. To compensate for pulse distortion, the foregoing algorithm is modified according to the following five rules: (1) two to four consecutive positive or negative samples are decoded as "1" or "0", respectively; (2) five to nine consecutive positive or negative samples are decoded as "11" or "00", respectively, if they correspond to an "opencircuit" condition; (3) six to nine consecutive positive or negative samples are decoded as "11" or "00", respectively, if they correspond to an "short-circuit" condition; (4) ten to thirteen consecutive positive or negative samples are decoded as "111" or "000", respectively; and, (5) fourteen or more consecutive positive or negative samples are decoded as "1111" or "0000", respectively.

Figure 5:
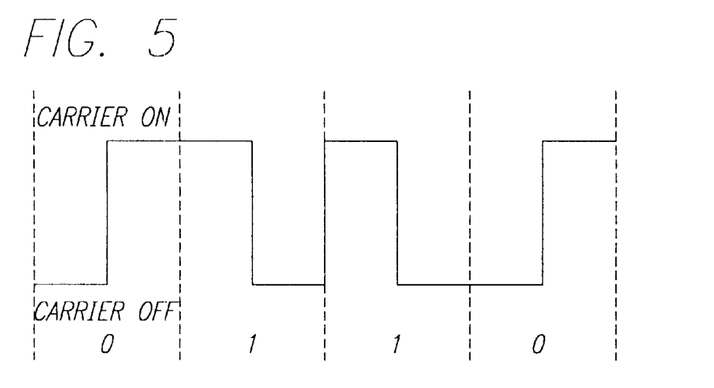
FIG. 5 is a graph illustrating a Manchester coding scheme according to an embodiment of the RF/ID interrogator.
Figure 6:
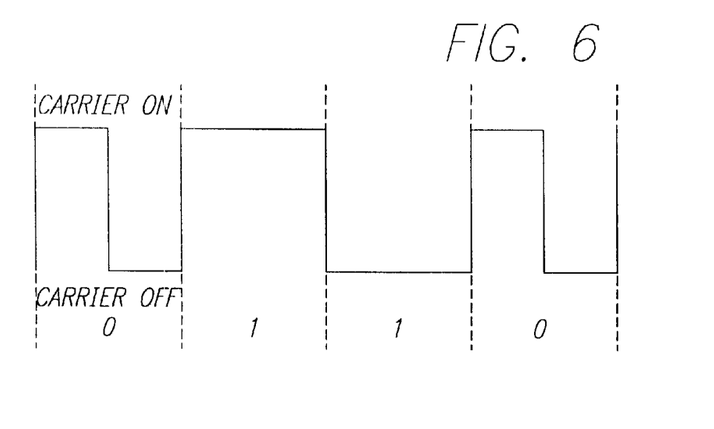
FIG. 6 is a graph illustrating a FM0 coding scheme according to another embodiment of the RF/ID interrogator.

Once the I and Q samples have been converted into a stream of digital bits, the information contained in the digital bits can be recovered. There are various encoding schemes in common usage that may be utilized with the present invention to encode the data transmitted by the RF/ID tag 15. Two exemplary encoding schemes are Manchester coding and FM0 coding, which each transmit two half-bits to communicate one full bit of data. The Manchester coding scheme encodes the "1" data bit with a transition from high to low in the middle of the bit. The "0" data bit has a transition from low to high in the middle of the bit. FIG. 5 illustrates the data word "0110" encoded using Manchester coding. The FM0 coding scheme encodes the "1" data bit as having transitions at the beginning and end of the bit. The "0" bit has an additional transition in the middle of the bit compared to the "1" bit. FIG. 6 illustrates the data word "0110" encoded using FM0 coding. It should be appreciated that other coding schemes may also be advantageously utilized in the present invention.

According to a preferred embodiment of the present invention, the digital bits decoded using the algorithm of FIG. 4 and stored in memory further comprise half-bits of transmitted data encoded by the RF/ID tag 15 using one of the Manchester coding and FM0 coding schemes. To recover the transmitted data, the DSP 32 therefore further decodes the digital bits according to the following algorithms. For Manchester-coded signals, a digital bit sequence of "01" is decoded as a data bit of "0", a digital bit sequence of "10" is decoded as a data bit of "1", and digital bit sequences of "00" or "11" are considered to be decoding errors. For FM0-coded signals, a digital bit sequence of either "01" or "10" is decoded as a data bit of "0", and a digital bit sequence of "00" or "11" is decoded as a data bit of "1".

Figure 7:
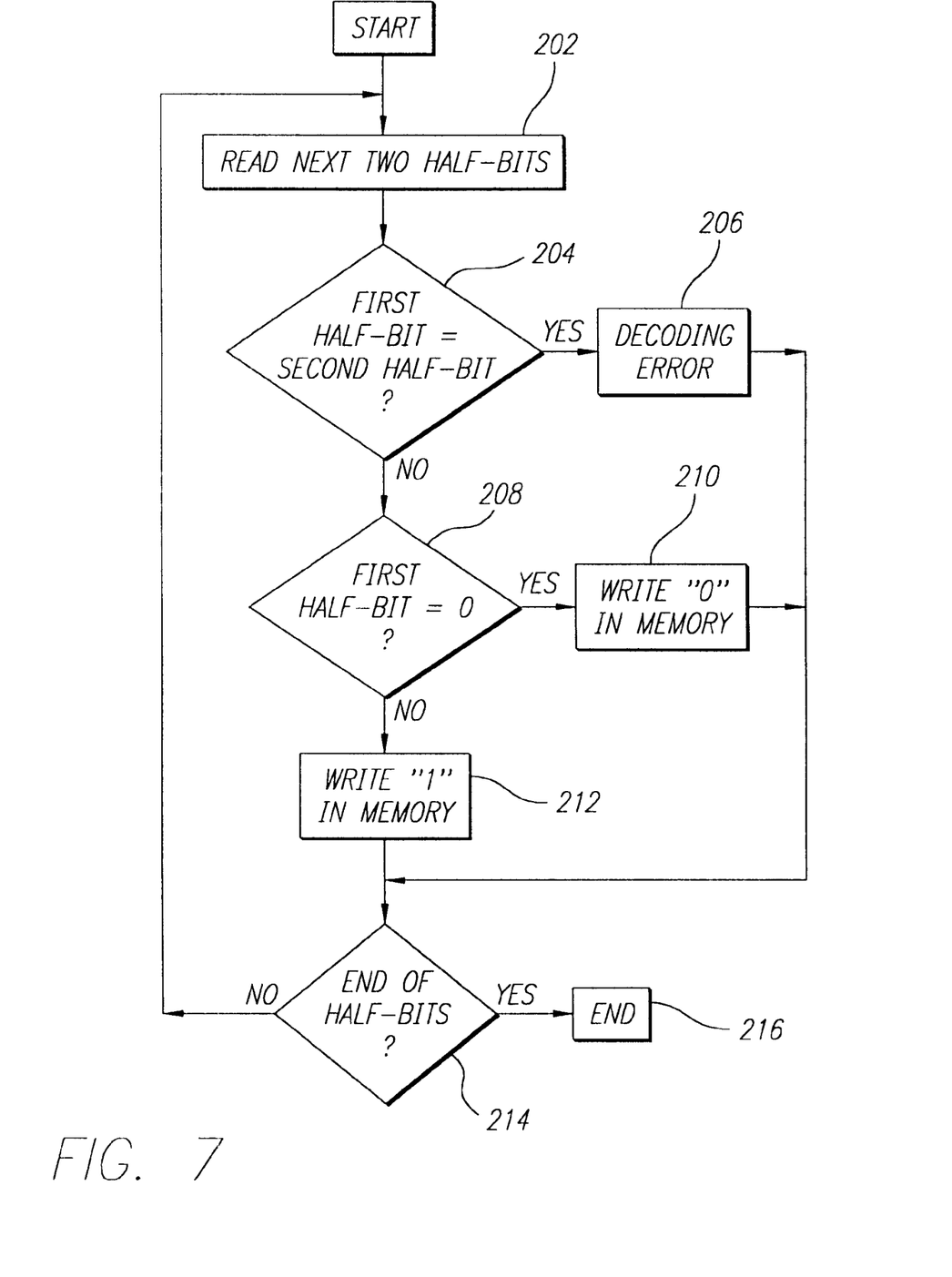
FIG. 7 is a flow chart illustrating an exemplary data decoding scheme for Manchester-coded signals.

Referring now to FIG. 7, an exemplary data decoding scheme for Manchester-coded signals is shown in flow chart form. The data decoding scheme comprises a loop that is called after the foregoing algorithm has executed to convert the received signals to a stream of half-bits of data. The loop begins at step 202, whereupon the DSP 32 reads two consecutive half-bits of data from memory. In the first pass through the loop, the first two half-bits of data of a received message are read. At step 204, the DSP 32 performs a comparison between the first half-bit and the second half-bit. If the two half-bits are the same, i.e., either "1" and "1", or "0" and "0", then a Manchester decoding error is present as indicated at step 206. If the first half-bit and the second half-bit are not the same, then the algorithm passes to step 208 in which the DSP 32 compares the first half-bit to "0". If the first half-bit is equal to "0", then the DSP 32 writes "0" to memory at step 210. Conversely, if the first half-bit is equal to "1", then the DSP 32 writes "1" to memory at step 212. After each of steps 206, 210 and 212, the algorithm passes to step 214, in which the DSP 32 determines whether the end of the stream of half-bits of data has been reached. If the end has been reached, the algorithm terminates at step 216. If the end has not been reached, the algorithm returns to step 202, and the loop is repeated with the next two half-bits of data.

Figure 8:
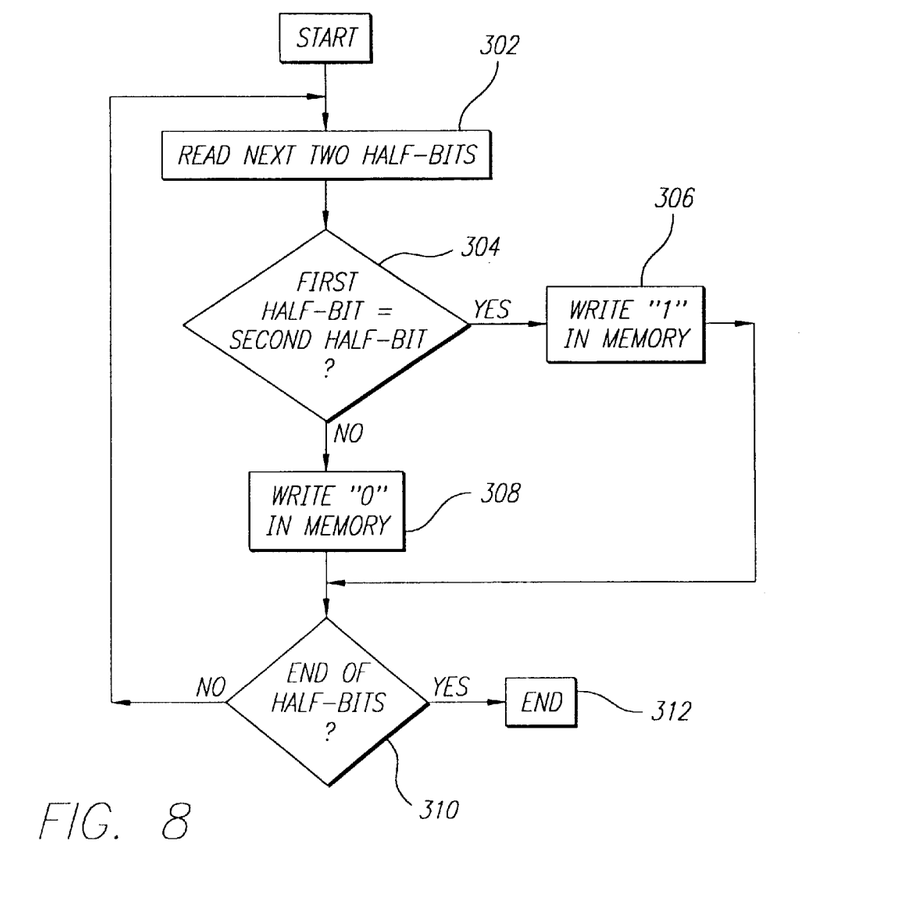
FIG. 8 is a flow chart illustrating an exemplary data decoding scheme for FM0-coded signals.

FIG. 8 illustrates an exemplary data decoding scheme for FM0-coded signals in flow chart form. As with the algorithm of FIG. 7, the data decoding scheme comprises a loop that is called after the received I and Q signals have been converted to a stream of half-bits of data. The loop begins at step 302, whereupon the DSP 32 reads two consecutive half-bits of data from memory. At step 304, the DSP 32 performs a comparison between the first half-bit and the second half-bit. If the two half-bits are the same, i.e., either "1" and "1", or "0" and "0", then the DSP 32 writes "1" to memory at step 306. If the two half-bits are not the same, then the DSP 32 writes "0" to memory at step 308. After each of steps 306 and 308, the algorithm passes to step 310, in which the DSP 32 determines whether the end of the stream of half-bits of data has been reached. If the end has been reached, the algorithm terminates at step 312. If the end has not been reached, the algorithm returns to step 302, and the loop is repeated with the next two half-bits of data.

Figure 9:
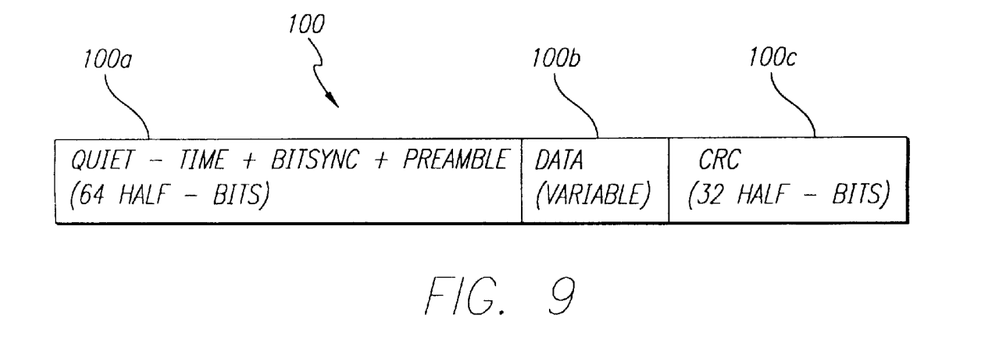
FIG. 9 is a block diagram illustrating a format for a message packet received by an RF/ID interrogator from a transponder.

Referring now to FIG. 9, an exemplary data packet 100 communicated by an RF/ID tag 15 is illustrated. The data packet is divided into three sections, including an initial synchronization portion 100*a*, a data portion 100*b*, and an error correction portion 100*c*. The initial synchronization portion 100*a* includes a "quiet-time" pattern, a bit-synchronization pattern, and a preamble. The quiet-time pattern comprises a sequence of half-bits that correspond in duration to the transient settling time of the baseband filter 37. In the present RF/ID interrogator, a quiet-time pattern of thirty-six successive half-bits of "1" is utilized. This relatively short quiet-time pattern is possible by providing transient suppression of the incoming I and Q signals, though it should be appreciated that longer quiet-time patterns may also be utilized. The bit-synchronization pattern comprises a repeating sequence of "10" totaling sixteen half-bits in length. An example of the combined fifty-two half-bit long quiet-time and bit-synchronization patterns is given below as:

1111 1111 1111 1111 1111 1111 1111 1111 1111 1010 1010 1010 1010

The preamble comprises a sequence of half-bits that permits the RF/ID interrogator 10 to synchronize with the incoming I and Q signals. The preamble is known in advance by the RF/ID interrogator 10 and is used to correlate to the decoded half-bits of the received signals. The particular bit sequence of the preamble is specifically chosen to provide optimum auto-correlation characteristics. In a preferred embodiment of the invention, the preamble includes at least one Manchester error, and, since a "0" corresponds to a short-circuit condition of the RF/ID tag antenna, the preamble does not include more than two consecutive "0"s. An example of a twelve half-bit preamble pattern is given below as:

1100 0100 1110

The data portion 100*b* of a data packet contains the information to be communicated from the tag to the RF/ID interrogator 10. In the preferred embodiment of the invention, the length of the data portion is variable, but it should also be appreciated that fixed length data packets may also be advantageously utilized. As discussed above, the data may be encoded using known encoding schemes, such as Manchester coding and FM0 coding in which two successive half-bits correspond to a single data bit. The error correction portion 100*c* following the data portion 100*b* includes a cyclic redundancy check (CRC) code that enables error correction of the decoded data. In the preferred embodiment of the invention, a sixteen bit (i.e., thirty-two half-bits) CRC code is the one's complement of the remainder generated by the modulo two division of the data packet by the polynomial $X^{16}+X^{12}+X^{5}+1$. The CRC calculation is performed after decoding of the digital bits, as described above.

The DSP 32 can select either the I-channel or the Q-channel for decoding and preamble recovery. In a preferred embodiment of the invention, the DSP 32 selects the channel with the strongest signal strength for initial decoding. If the maximum signal strength reaches the saturation value of the A/D converters $78_1$, $78_2$, the A/D converters can switch to a reduced gain stage to scale down the signal strength for recovery of the rest of the incoming signals. If the initial decoding indicates the existence of valid signals, but fails to decode the preamble after a time-out period or fails to decode data successfully (e.g., occurrence of Manchester decoding error or CRC check error), the DSP 32 can recover data from a combination of the I and Q signals using the foregoing process.

Figure 10:
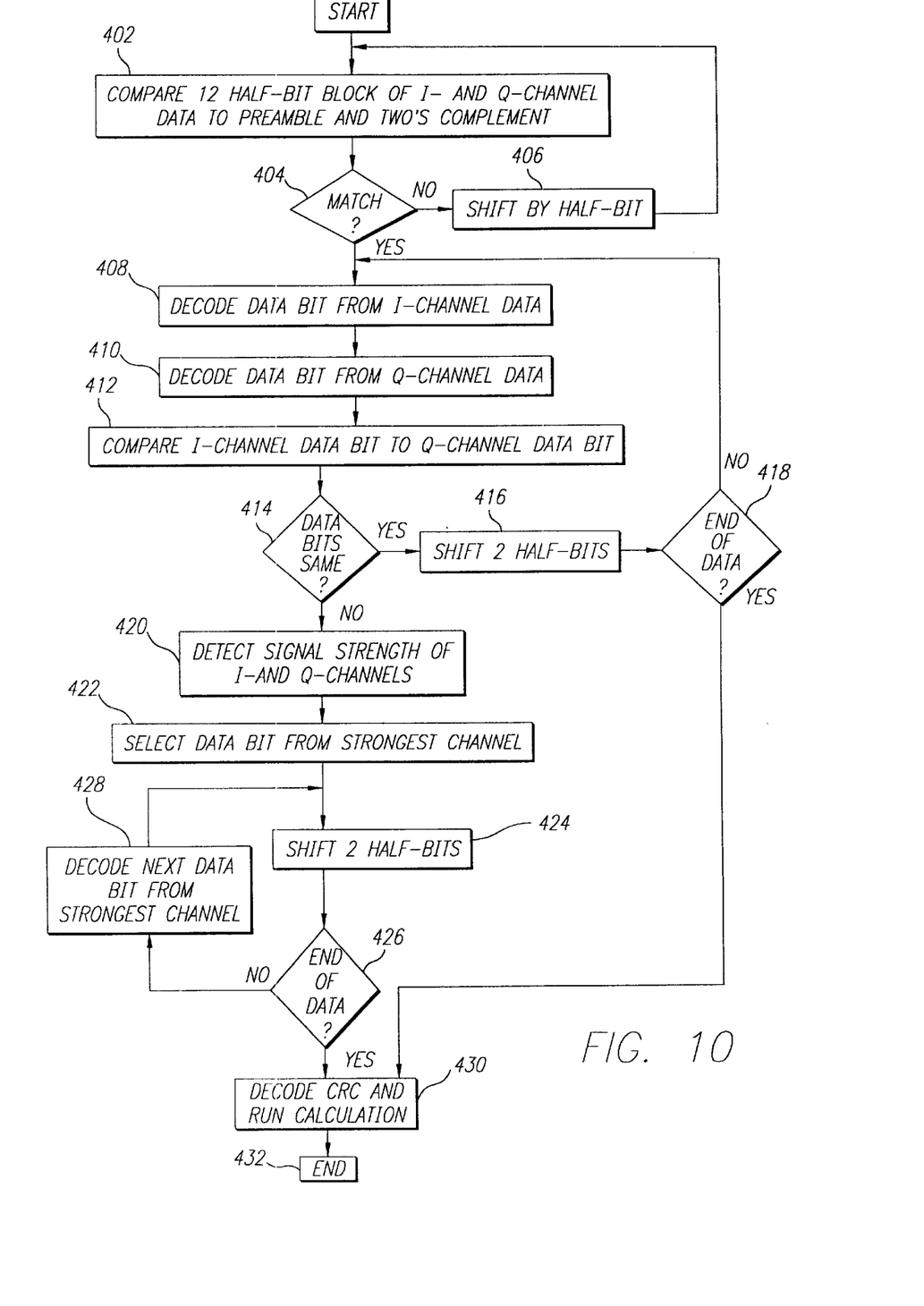
FIG. 10 is a flow chart illustrating a data decoding algorithm according to another embodiment of the RF/ID interrogator.

A simplified decoding algorithm for FM0 encoded data is illustrated in FIG. 10. The decoding algorithm takes advantage of the fact that in FM0 coding the phase of the I and Q signals does not affect the decoding decision. The decoding algorithm begins at step 402, at which the DSP 32 performs a comparison between the preamble and the I and Q digital bits (i.e., half-bits) stored in memory as a result of the algorithm of FIG. 4. As described above, digital bits recovered from each of the I- and Q-channels are stored in respective locations in memory by the DSP 32. At step 402, twelve half-bit long blocks of digital bits recovered from both the I and Q signals are retrieved from memory, and compared with the preamble and the two's complement of the preamble. At step 404, a determination is made whether there is a match between either one of the two blocks and either one of the preamble or the two's complement of the preamble. If no match is detected, the blocks are shifted by one half-bit at step 406, and the comparison of step 402 is repeated. Conversely, if a match is detected at step 404, then the algorithm passes to step 408. As described above, the quiet-time and bit synchronization patterns comprise the first fifty-two half-bits of a received data packet, so it is anticipated that the algorithm will cycle through steps 402, 404 and 406 numerous times before a match is finally detected at step 404.

At step 408, the DSP 32 decodes a single data bit from two successive digital bits stored in memory recovered from the I-channel. Similarly, at step 410, the DSP 32 decodes a single data bit from two successive digital bits stored in memory recovered from the Q-channel. The two successive digital bits of each of the I- and Q-channels comprise the next ones following the twelve half-bit blocks used for comparison with the preamble, as discussed above. The digital bits are decoded in steps 408, 410 using the FM0 decoding algorithm described above with respect to FIG. 8.

At step 412, a comparison is made between the data bits decoded from the I- and Q-channel digital bits. Thereafter, at step 414, a determination is made as to whether the two decoded data bits are the same. If they are the same, this is an indication that the data bits are valid. In that case, the DSP 32 shifts by two half-bits at step 416, and makes a determination at step 418 as to whether the end of the data packet 100 has been reached, i.e., no additional half-bits remaining in the stored memory space. If the end of the data packet was not reached, the algorithm returns to step 408 and decodes the next two half-bits. Conversely, if the end of the data packet 100 was reached, the algorithm shifts to step 430, whereupon the CRC is decoded and calculated to verify the validity of the decoded data bits.

If it is determined at step 414 that the decoded data bits from the I- and Q-channels are not the same, then the algorithm must select one of the I- and Q-channels for further decoding. At step 420, the algorithm detects the signal strength of I- and Q-channels to determine which one is stronger. To perform this step, the DSP 32 may receive input data from the analog baseband filter 37, or from the radio module 40. Then, at step 422, the decoded data bit from the strongest one of the I- and Q-channels is selected, and further data decoding is performed for that selected channel only. As above, the DSP 32 shifts by two half-bits at step 424, and makes a determination at step 426 as to whether the end of the data packet has been reached. If the end of the data packet was not reached, the algorithm decodes the next two half-bits at step 428 and then returns to step 424. Conversely, if the end of the data packet 100 was reached, the algorithm shifts to step 430, whereupon the CRC is decoded and calculated as described above. The algorithm ends at step 432 following completion of the CRC calculation.

Alternatively, the DSP 32 can constantly monitor the signal strength of both the I- and the Q-channels, and switch between the two channels within a data message on the basis of the channel presently having the strongest signal strength. Another method for combining the I and Q signals in order to improve data recovery is disclosed in co-pending application Ser. No. 09/153,617, entitled "Radio Frequency Identification Interrogator Signal Processing System for Reading Moving Transponders," filed Sep. 15, 1998.

Having thus described a preferred embodiment of a data recovery system for an RF/ID interrogator, it should be apparent to those skilled in the art that certain advantages of the aforementioned system have been achieved. It should also be appreciated that various modifications, adaptations, and alternative embodiments thereof may be made within the scope and spirit of the present invention. The invention is further defined by the following claims.

What is claimed is:

1. An apparatus for recovering a data signal transmitted from a radio frequency identification (RF/ID) transponder, comprising:

a radio having a receiver portion adapted to receive signals from said RF/ID transponder transmitted at a predetermined bit-rate;

a processor coupled to said radio and further having a memory containing stored instructions to be executed by said processor, said stored instructions comprising:

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity.

2. An apparatus for recovering a data signal transmitted from a radio frequency identification (RF/ID) transponder, comprising:

a radio having a receiver portion adapted to receive signals from said RF/ID transponder transmitted at a predetermined bit-rate;

a processor coupled to said radio and further having a memory containing stored instructions to be executed by said processor, said stored instructions comprising:

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity;

wherein said sampling rate is at least four times said bit rate.

3. An apparatus for recovering a data signal transmitted from a radio frequency identification (RF/ID) transponder, comprising:

a radio having a receiver portion adapted to receive signals from said RF/ID transponder transmitted at a predetermined bit-rate;

a processor coupled to said radio and further having a memory containing stored instructions to be executed by said processor, said stored instructions comprising:

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity, wherein said deriving instruction further comprises decoding a first range of consecutive positive. pulses as a "1" data bit and said first range of consecutive negative pulses as a "0" data bit.

4. The apparatus of claim 3, wherein said deriving instruction further comprises decoding a second range of consecutive positive pulses as "11" data bits and said second range of consecutive negative pulses as "00" data bits.

5. The apparatus of claim 4, wherein said deriving instruction further comprises decoding a third range of consecutive positive pulses as "111" data bits and said third range of consecutive negative pulses as "000" data bits.

6. The apparatus of claim 5, wherein said deriving instruction further comprises decoding a fourth range of consecutive positive pulses as "1111" data bits and said second range of consecutive negative pulses as "0000" data bits.

7. An apparatus for recovering a data signal transmitted from a radio frequency identification (RF/ID) transponder, comprising:

a radio having a receiver portion adapted to receive signals from said RF/ID transponder transmitted at a predetermined bit-rate;

a processor coupled to said radio and further having a memory containing stored instructions to be executed by said processor, said stored instructions comprising:

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity;

wherein said signals received from said RF/ID transponder further comprise in-phase (I) and quadrature-phase (Q) signal components.

8. The apparatus of claim 7, wherein said stored instructions further comprise selecting one of said I and Q signals for performing said sampling instruction based on relative signal strength of said I and Q signals.

9. The apparatus of claim 7, wherein said sampling instruction further comprises sampling a combination of said I and Q signals.

10. An apparatus for recovering a data signal transmitted from a radio frequency identification (RF/ID) transponder, comprising:

a radio having a receiver portion adapted to receive signals from said RF/ID transponder transmitted at a predetermined bit-rate;

a processor coupled to said radio and further having a memory containing stored instructions to be executed by said processor, said stored instructions comprising:

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity;

wherein said processor further comprises:

a clock circuit providing a high frequency clock signal;

a divider circuit coupled to said clock circuit and reducing said clock signal to provide a periodic interrupt signal at said sampling rate; and analog-to-digital converters adapted to receive said signals from said RF/ID transponder, said analog-to-digital converters being triggered by said interrupt signal.

11. The apparatus of claim 10 wherein said divider circuit is programmable to selectively vary an amount of reduction of said clock signal.

12. An apparatus for recovering a data signal transmitted from a radio frequency identification (RF/ID) transponder, comprising:

a radio having a receiver portion adapted to receive signals from said RF/ID transponder transmitted at a predetermined bit-rate;

a processor coupled to said radio and further having a memory containing stored instructions to be executed by said processor, said stored instructions comprising:

sampling said signals at a sampling rate higher than said bit-rate to provide plural signal samples;

comparing relative polarity of successive ones of the plural signal samples;

deriving data bits from said successive ones of the plural signal samples in correspondence with predetermined ranges of numbers of said successive ones of the plural signal samples having same relative polarity; and recovering an encoded data signal from said derived data bits.

13. The apparatus of claim 12, wherein said recovering instruction further comprises recovering a data signal encoded using Manchester coding.

14. The apparatus of claim 12, wherein said recovering instruction further comprises recovering a data signal encoded using FM0 coding.

15. An apparatus for recovering a data signal transmitted from a radio frequency identification (RF/ID) transponder, comprising:

a radio having a receiver portion adapted to receive signals from said RF/ID transponder transmitted at a predetermined bit-rate;

a processor coupled to said radio and further having a memory containing stored instructions to be executed by said processor, said stored instructions comprising:

sampling said signals at a sampling rate higher than said bit-rate to provide plural signal samples;

comparing relative polarity of successive ones of the plural signal samples;

deriving data bits from said successive ones of the plural signal samples in correspondence with predetermined ranges of numbers of said successive ones of the plural signal samples having same relative polarity; and selecting said predetermined range of numbers depending upon whether positive pulses of said signals correspond to an open-circuit or closed-circuit transmitting condition of said RF/ID transponder.

16. A method for recovering a data signal transmitted from a radio frequency identification (RF/ID) transponder, comprising the steps of:

receiving signals from said RF/ID transponder transmitted at a predetermined bit-rate;

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity.

17. A method for recovering a data signal transmitted from a radio frequency identification (RF/ID) transponder, comprising the steps of:

receiving signals from said RF/ID transponder transmitted at a predetermined bit-rate;

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity;

wherein said sampling rate is at least four times said bit rate.

18. A method for recovering a data signal transmitted from a radio frequency identification (RF/ID) transponder, comprising the steps of:

receiving signals from said RF/ID transponder transmitted at a predetermined bit-rate;

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity, further comprising decoding a first range of consecutive positive pulses as a "1" data bit and said first range of consecutive negative pulses as a "0" data bit.

19. The method of claim 18, wherein said deriving step further comprises decoding a second range of consecutive positive pulses as "11" data bits and said second range of consecutive negative pulses as "00" data bits.

20. The method of claim 19, wherein said deriving step further comprises decoding a third range of consecutive positive pulses as "111" data bits and said third range of consecutive negative pulses as "000" data bits.

21. The method of claim 20, wherein said deriving step further comprises decoding a fourth range of consecutive positive pulses as "1111" data bits and said second range of consecutive negative pulses as "0000" data bits.

22. A method for recovering a data signal transmitted from a radio frequency identification (RF/ID) transponder, comprising the steps of:

receiving signals from said RF/ID transponder transmitted at a predetermined bit-rate;

sampling said signals at a sampling rate higher than said bit-rate to provide plural signal samples;

comparing relative polarity of successive ones of the plural signal samples;

deriving data bits from said successive ones of the plural signal samples in correspondence with predetermined ranges of numbers of said successive ones of the plural signal samples having same relative polarity; and selectively varying said sampling rate.

23. A method for recovering a data signal transmitted from a radio frequency identification (RF/ID) transponder, comprising the steps of:

receiving signals from said RF/ID transponder transmitted at a predetermined bit-rate;

sampling said signals at a sampling rate higher than said bit-rate to provide plural signal samples;

comparing relative polarity of successive ones of the plural signal samples;

deriving data bits from said successive ones of the plural signal samples in correspondence with predetermined ranges of numbers of said successive ones of the plural signal samples having same relative polarity; and recovering an encoded data signal from said derived data bits.

24. The method of claim 23, wherein said recovering step further comprises recovering a data signal encoded using Manchester coding.

25. The method of claim 23, wherein said recovering step further comprises recovering a data signal encoded using FM0 coding.

26. A method for recovering a data signal transmitted from a radio frequency identification (RF/ID) transponder, comprising the steps of:

receiving signals from said RF/ID transponder transmitted at a predetermined bit-rate;

sampling said signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity;

wherein said receiving step further comprises receiving in-phase (I) and quadrature-phase (Q) signals from said RF/ID transponder.

27. The method of claim 26, further comprising the step of selecting said predetermined range of numbers depending upon whether positive pulses of said I and Q signals correspond to an open-circuit or closed-circuit transmitting condition of said RF/ID transponder.

28. The method of claim 26, further comprising the step of selecting one of said I and Q signals for performing said sampling instruction based on relative signal strength of said I and Q signals.

29. The method of claim 26, wherein said sampling step further comprises sampling a combination of said I and Q signals.

30. An apparatus for receiving a data signal transmitted from a radio frequency identification (RF/ID) transponder, comprising;

a radio having a receiver portion adapted to receive in-phase (I) and quadrature-phase (Q) signals from said RF/ID transponder transmitted at a predetermined bit-rate;

a processor coupled to said radio and further having a memory containing stored instructions to be executed by said processor, said stored instructions comprising:

detecting a relative signal strength of said I and Q signals;
selecting at least one of said I and Q signals for subsequent processing based on said detected relative signal strength; and
recovering data bits from said selected one of said I and Q signals.

31. An apparatus for receiving a data signal transmitted from a radio frequency identification (RF/ID) transponder, comprising:
a radio having a receiver portion adapted to receive in-phase (I) and quadrature-phase (Q) signals from said RF/ID transponder transmitted at a predetermined bit-rate;
a processor coupled to said radio and further having a memory containing stored instructions to be executed by said processor, said stored instructions comprising:
detecting a relative signal strength of said I and Q signals;
selecting at least one of said I and Q signals for subsequent processing based on said detected relative signal strength; and
recovering data bits from said selected one of said I and Q signals;
wherein said selecting instruction further comprises selecting one of said I and Q signals having highest initial signal strength.

32. An apparatus for receiving a data signal transmitted from a radio frequency identification (RF/ID) transponder, comprising:
a radio having a receiver portion adapted to receive in-phase (I) and quadrature-phase (Q) signals from said RF/ID transponder transmitted at a predetermined bit-rate;
a processor coupled to said radio and further having a memory containing stored instructions to be executed by said processor, said stored instructions comprising:
detecting a relative signal strength of said I and Q signals;
selecting at least one of said I and Q signals for subsequent processing based on said detected relative signal strength; and
recovering data bits from said selected one of said I and Q signals;
wherein said selecting instruction further comprises selecting a combination of said I and Q signals.

33. An apparatus for receiving a data signal transmitted from a radio frequency identification (RF/ID) transponder, comprising:
a radio having a receiver portion adapted to receive in-phase (I) and quadrature-phase (Q) signals from said RF/ID transponder transmitted at a predetermined bit-rate;
a processor coupled to said radio and further having a memory containing stored instructions to be executed by said processor, said stored instructions comprising:
detecting a relative signal strength of said I and Q signals;
selecting at least one of said I and Q signals for subsequent processing based on said detected relative signal strength; and
recovering data bits from said selected one of said I and Q signals;
wherein said detecting instruction is executed continuously, and said selecting instruction further comprises selecting one of said I and Q signals having highest current signal strength.

34. An apparatus for receiving a data signal transmitted from a radio frequency identification (RF/ID) transponder, comprising:
a radio having a receiver portion adapted to receive in-phase (I) and quadrature-phase (Q) signals from said RF/ID transponder transmitted at a predetermined bit-rate;
a processor coupled to said radio and further having a memory containing stored instructions to be executed by said processor, said stored instructions comprising:
detecting a relative signal strength of said I and Q signals;
selecting at least one of said I and Q signals for subsequent processing based on said detected relative signal strength; and
recovering data bits from said selected one of said I and Q signals, further comprising:
sampling said selected one of said I and Q signals at a sampling rate higher than said bit-rate to provide plural signal samples;
comparing relative polarity of successive ones of the plural signal samples; and
deriving data bits from said successive ones of the plural signal samples in correspondence with predetermined ranges of numbers of said successive ones of the plural signal samples having same relative polarity.

35. The apparatus of claim 34, wherein said sampling rate is at least four times said bit-rate.

36. A method for receiving a data signal transmitted from a radio frequency identification (RF/ID) transponder, comprising the steps of:
receiving in-phase (I) and quadrature-phase (Q) signals from said RF/ID transponder transmitted at a predetermined bit-rate;
detecting a relative signal strength of said I and Q signals;
selecting at least one of said I and Q signals for subsequent processing based on said detected relative signal strength; and
recovering data bits from said selected one of said I and Q signals.

37. A method for receiving a data signal transmitted from a radio frequency identification (RF/ID) transponder, comprising the steps of:
receiving in-phase (I) and quadrature-phase (Q) signals from said RF/ID transponder transmitted at a predetermined bit-rate;
detecting a relative signal strength of said I and Q signals;
selecting at least one of said I and Q signals for subsequent processing based on said detected relative signal strength; and
recovering data bits from said selected one of said I and Q signals;
wherein said selecting step further comprises selecting one of said I and Q signals having highest initial signal strength.

38. A method for receiving a data signal transmitted from a radio frequency identification (RF/ID) transponder, comprising the steps of:
receiving in-phase (I) and quadrature-phase (Q) signals from said RF/ID transponder transmitted at a predetermined bit-rate;
detecting a relative signal strength of said I and Q signals;
selecting at least one of said I and Q signals for subsequent processing based on said detected relative signal strength; and recovering data bits from said selected one of said I and Q signals;

wherein said selecting step further comprises selecting a combination of said I and Q signals.

39. A method for receiving a data signal transmitted from a radio frequency identification (RF/ID) transponder, comprising the steps of:

receiving in-phase (I) and quadrature-phase (Q) signals from said RF/ID transponder transmitted at a predetermined bit-rate;

detecting a relative signal strength of said I and Q signals;

selecting at least one of said I and Q signals for subsequent processing based on said detected relative signal strength; and recovering data bits from said selected one of said I and Q signals;

wherein said selecting step further comprises selecting one of said I and Q signals having highest current signal strength.

40. A method for receiving a data signal transmitted from a radio frequency identification (RF/ID) transponder, comprising the steps of:

receiving in-phase (I) and quadrature-phase (Q) signals from said RF/ID transponder transmitted at a predetermined bit-rate;

detecting a relative signal strength of said I and Q signals;

selecting at least one of said I and Q signals for subsequent processing based on said detected relative signal strength; and recovering data bits from said selected one of said I and Q signals;

wherein said recovering step further comprises:

sampling said selected one of said I and Q signals at a sampling rate higher than said bit-rate to provide plural signal samples;

comparing relative polarity of successive ones of the plural signal samples; and deriving data bits from said successive ones of the plural signal samples in correspondence with predetermined ranges of numbers of said successive ones of the plural signal samples having same relative polarity.

41. A method for receiving a data signal transmitted from a radio frequency identification (RF/ID) transponder, comprising the steps of:

receiving in-phase (I) and quadrature-phase (Q) signals from said RF/ID transponder transmitted at a predetermined bit-rate;

detecting a relative signal strength of said I and Q signals;

selecting at least one of said I and Q signals for subsequent processing based on said detected relative signal strength; and recovering data bits from said selected one of said I and Q signals;

wherein said sampling rate is at least four times said bit rate.

42. An apparatus for receiving a data signal transmitted from a radio frequency identification (RF/ID) transponder, comprising:

a radio having a receiver portion adapted to receive in-phase (I) and quadrature-phase (Q) signals from said RF/ID transponder;

a processor coupled to said radio and further having a memory containing stored instructions to be executed by said processor, said stored instructions comprising:

decoding at least one data bit from each of said I and Q signals according to a predetermined encoding scheme;

comparing said at least one data bit decoded from each of said I and Q signals; and decoding remaining data bits of said I and Q signals if said at least one data bit of each of said I and Q signals matches, and decoding remaining data bits of a stronger one of said I and Q signals if said at least one data bit of each of said I and Q signals fails to match.

43. An apparatus for receiving a data signal transmitted from a radio frequency identification (RF/ID) transponder, comprising:

a radio having a receiver portion adapted to receive in-phase (I) and quadrature-phase (Q) signals from said RF/ID transponder;

a processor couples to said radio and further having a memory containing stored instructions to be executed by said processor, said stored instructions comprising:

decoding at least one data bit from each of said I and Q signals according to a predetermined encoding scheme;

comparing said at least one data bit decoded from each of said I and Q signals;

decoding remaining data bits of said I and Q signals if said at least one data bit of each of said I and Q signals matches, and decoding remaining data bits of a stronger one of said I and Q signals if said at least one data bit of each of said I and Q signals fails to match; and correlating said I and Q signals to a predetermined preamble pattern.

44. An apparatus for receiving a data signal transmitted from a radio frequency identification (RF/ID) transponder, comprising:

a radio having a receiver portion adapted to receive in-phase (I) and quadrature-phase (Q) signals from said RF/ID transponder;

a processor couples to said radio and further having a memory containing stored instructions to be executed by said processor, said stored instructions comprising:

decoding at least one data bit from each of said I and Q signals according to a predetermined encoding scheme;

comparing said at least one data bit decoded from each of said I and Q signals; and decoding remaining data bits of said I and Q signals if said at least one data bit of each of said I and Q signals matches, and decoding remaining data bits of a stronger one of said I and Q signals if said at least one data bit of each of said I and Q signals fails to match;

wherein said predetermined encoding scheme further comprises FM0.

45. An apparatus for receiving a data signal transmitted from a radio frequency identification (RF/ID) transponder, comprising:

a radio having a receiver portion adapted to receive in-phase (I) and quadrature-phase (Q) signals from said RF/ID transponder;

a processor couples to said radio and further having a memory containing stored instructions to be executed by said processor, said stored instructions comprising:

decoding at least one data bit from each of said I and Q signals according to a predetermined encoding scheme;

comparing said at least one data bit decoded from each of said I and Q signals;

decoding remaining data bits of said I and Q signals if said at least one data bit of each of said I and Q signals matches, and decoding remaining data bits of a stronger one of said I and Q signals if said at least one data bit of each of said I and Q signals fails to match; and verifying that errors are not present in said decoded data bits.

46. An apparatus for receiving a data signal transmitted from a radio frequency identification (RF/ID) transponder, comprising:

a radio having a receiver portion adapted to receive in-phase (I) and quadrature-phase (Q) signals from said RF/ID transponder;

a processor couples to said radio and further having a memory containing stored instructions to be executed by said processor, said stored instructions comprising:

decoding at least one data bit from each of said I and Q signals according to a predetermined encoding scheme;

comparing said at least one data bit decoded from each of said I and Q signals;

decoding remaining data bits of said I and Q signals if said at least one data bit of each of said I and Q signals matches, and decoding remaining data bits of a stronger one of said I and Q signals if said at least one data bit of each of said I and Q signals fails to match;

sampling said I and Q signals at a sampling rate higher than a predetermined bit-rate of said I and Q signals to provide plural signal samples;

comparing relative polarity of successive ones of the plural signal samples; and deriving encoded half-bits from said successive ones of the plural signal samples in correspondence with predetermined ranges of numbers of said successive ones of the plural signal samples having same relative polarity.

47. The apparatus of claim 46, wherein said sampling rate is at least four times said redetermined bit-rate.

48. A method for receiving a data signal transmitted from a radio frequency identification (RF/ID) transponder, comprising the steps of:

receiving in-phase (I) and quadrature-phase (Q) signals from said RF/ID transponder;

decoding at least one data bit from each of said I and Q signals according to a predetermined encoding scheme;

comparing said at least one data bit decoded from each of said I and Q signals; and decoding remaining data bits of said I and Q signals if said at least one data bit of each of said I and Q signals matches, and decoding remaining data bits of a stronger one of said I and Q signals if said at least one data bit of each of said I and Q signals fails to match.

49. A method for receiving a data signal transmitted from a radio frequency identification (RF/ID) transponder, comprising the steps of:

receiving in-phase (I) and quadrature-phase (Q) signals from said RF/ID transponder:

decoding at least one data bit from each of said I and Q signals according to a predetermined encoding scheme;

comparing said at least one data bit decoded from each of said I and Q signals;

decoding remaining data bits of said I and Q signals if said at least one data bit of each of said I and Q signals matches, and decoding remaining data bits of a stronger one of said I and Q signals if said at least one data bit of each of said I and Q signals fails to match; and correlating said I and Q signals to a predetermined preamble pattern.

50. A method for receiving a data signal transmitted from a radio frequency identification (RF/ID) transponder, comprising the steps of:

receiving in-phase (I) and quadrature-phase (Q) signals from said RF/ID transponder;

decoding at least one data bit from each of said I and Q signals according to a predetermined encoding scheme;

comparing said at least one data bit decoded from each of said I and Q signals;

decoding remaining data bits of said I and Q signals if said at least one data bit of each of said I and Q signals matches, and decoding remaining data bits of a stronger one of said I and Q signals if said at least one data bit of each of said I and Q signals fails to match;

wherein said decoding step further comprises decoding at least one data bit from each of said I and Q signals according to a FM0 encoding scheme.

51. A method for receiving a data signal transmitted from a radio frequency identification (RF/ID) transponder, comprising the steps of:

receiving in-phase (I) and quadrature-phase (Q) signals from said RF/ID transponder;

decoding at least one data bit from each of said I and Q signals according to a predetermined encoding scheme;

comparing said at least one data bit decoded from each of said I and Q signals;

decoding remaining data bits of said I and Q signals if said at least one data bit of each of said I and Q signals matches, and decoding remaining data bits of a stronger one of said I and Q signals if said at least one data bit of each of said I and Q signals fails to match; and verifying that errors are not present in said decoded data bits.

52. A method for receiving a data signal transmitted from a radio frequency identification (RF/ID) transponder, comprising the steps of:

receiving in-phase (I) and quadrature-phase (Q) signals from said RF/ID transponder;

decoding at least one data bit from each of said I and Q signals according to a predetermined encoding scheme;

comparing said at least one data bit decoded from each of said I and Q signals;

decoding remaining data bits of said I and Q signals if said at least one data bit of each of said I and Q signals matches, and decoding remaining data bits of a stronger one of said I and Q signals if said at least one data bit of each of said I and Q signals fails to match;

sampling said I and Q signals at a sampling rate higher than a predetermined bit-rate of said I and Q signals to provide plural signal samples;

comparing relative polarity of successive ones of the plural signal samples; and deriving encoded half-bits from said successive ones of the plural signal samples in correspondence with predetermined ranges of numbers of said successive ones of the plural signal samples having same relative polarity.

53. The method of claim 52, wherein said sampling rate is at least four times said predetermined bit-rate.

* * * * *